(12) United States Patent
Takaki (10) Patent No.: US 10,592,755 B2
(45) Date of Patent: Mar. 17, 2020

(54) APPARATUS AND METHOD FOR CONTROLLING VEHICLE (71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 125 days.

(21) Appl. No.: 15/882,896

(22) Filed: Jan. 29, 2018

(65) Prior Publication Data
US 2018/0218228 A1 Aug. 2, 2018

(30) Foreign Application Priority Data
Jan. 31, 2017 (JP) .................................. 2017-016079

(51) Int. Cl.
G06K 9/00 (2006.01)
G06K 9/20 (2006.01)
(Continued)

(52) U.S. Cl.
CPC ......... *G06K 9/00805* (2013.01); *B60W 10/18* (2013.01); *B60W 10/20* (2013.01);
(Continued)

(58) Field of Classification Search
CPC ............. G06K 9/00805; G06K 9/2018; G06K 9/6288; G06K 9/00369; G06K 9/6215; G06K 9/3233; G06K 9/629; G06K 9/00791; G06K 9/00798; B60W 30/09; B60W 30/08; B60W 30/16; B60W 2420/42; B60W 2420/52; B60W 2550/10;
(Continued)

(56) References Cited

U.S. PATENT DOCUMENTS 7,460,951 B2 * 12/2008 Altan .................... G01S 13/726
340/903
2001/0031068 A1 * 10/2001 Ohta ......................... G01C 3/08
382/103
(Continued)

FOREIGN PATENT DOCUMENTS

JP 2010-244474 10/2010
JP 2013-117475 6/2013

*Primary Examiner* — Jose L Couso
(74) *Attorney, Agent, or Firm* — Knobbe, Martens, Olson & Bear, LLP (57) ABSTRACT

In an apparatus for controlling a vehicle equipped with a radar device and an imaging device to detect an object around the vehicle. In the apparatus, an identity determiner is configured to, based on a first predicted time to collision with a first target and a second predicted time to collision with a second target, perform an identity determination as to whether or not the first target and the second target correspond to the same object. A scene determiner is configured to determine whether or not one of at least one specific scene where large calculation errors in the second predicted time may be generated is matched depending on the calculation method corresponding to the second predicted time to collision. A determination aspect setter is configured to, based on the calculation method and a result of determination by the scene determiner, set an aspect of the identity determination.

11 Claims, 3 Drawing Sheets

(51) Int. Cl.
*G01S 13/931* (2020.01)
*G01S 13/86* (2006.01)
*B60W 30/09* (2012.01)
*G06K 9/62* (2006.01)
*G01S 13/72* (2006.01)
*B60W 10/18* (2012.01)
*B60W 10/20* (2006.01)
*G01S 13/93* (2020.01)

(52) U.S. Cl.
CPC ........... B60W 30/09 (2013.01); G01S 13/726 (2013.01); G01S 13/867 (2013.01); G01S 13/931 (2013.01); G06K 9/2018 (2013.01); G06K 9/6288 (2013.01); *B60W 2420/42* (2013.01); *B60W 2420/52* (2013.01); *B60W 2550/10* (2013.01); *B60W 2710/18* (2013.01); *B60W 2710/20* (2013.01); *B60W 2710/30* (2013.01); *G01S 2013/9342* (2013.01); *G01S 2013/9346* (2013.01)

(58) Field of Classification Search
CPC ....... B60W 2550/308; B60W 2710/18; B60W 2710/20; B60W 2710/30; G01S 13/726; G01S 13/867; G01S 13/931; G01S 13/93; G01S 13/86; G01S 13/862; G01S 13/865; G01S 2013/9342; G01S 2013/9346; G01S 2013/935; G01S 2013/9353; G01S 2013/9375; G01S 2013/9321; G01S 2013/9357; G01S 17/936; G01S 17/023; G08G 1/166; G08G 1/16; G06T 1/00; G06T 7/20; G06T 7/97; G06T 2207/30248; G06T 2207/30252; G06T 2207/30261; H04N 7/18; B60R 21/00; B60R 21/0132; B60R 21/0134; B60R 2300/301; B60R 2300/8093; G01C 11/06; G01C 3/08

See application file for complete search history.

(56) References Cited

U.S. PATENT DOCUMENTS

| | | | |
|---|---|---|---|
| 2004/0189512 A1* | 9/2004 | Takashima | G01S 13/931 342/70 |
| 2006/0274149 A1* | 12/2006 | Yoshizawa | B60R 21/0134 348/148 |
| 2009/0135065 A1* | 5/2009 | Tsuchida | G01S 13/391 342/454 |
| 2009/0201192 A1* | 8/2009 | Tokoro | B60R 21/0134 342/70 |
| 2010/0085238 A1* | 4/2010 | Muller-Frahm | G01S 11/12 342/70 |
| 2014/0333467 A1* | 11/2014 | Inomata | G01S 13/867 342/27 |
| 2015/0012185 A1* | 1/2015 | Harda | B60W 30/08 701/45 |
| 2016/0293010 A1* | 10/2016 | Kamijo | G08G 1/166 |
| 2017/0225614 A1* | 8/2017 | Park | B60R 21/00 |
| 2017/0232964 A1* | 8/2017 | Moritani | B60T 7/22 701/70 |
| 2017/0242117 A1* | 8/2017 | Izzat | G01S 13/867 |
| 2017/0309180 A1 | 10/2017 | Baba | |

* cited by examiner

APPARATUS AND METHOD FOR CONTROLLING VEHICLE

CROSS-REFERENCE TO RELATED APPLICATION

This application is based on and claims the benefit of priority from earlier Japanese Patent Application No. 2017-16079 filed Jan. 31, 2017, the descriptions of which are incorporated herein by reference.

BACKGROUND

Technical Field

The present disclosure relates to a vehicle control apparatus applied to a vehicle equipped with a radar device and an imaging device.

Related Art

A technique is known that includes matching a radar target detected by a radar device to an image target detected by an imaging device, and generating a new target (referred to as a fusion target) by fusion of the radar target and the image target if it is determined that the radar target and the image target are the same object.

For example, Japanese Patent Application Laid-Open Publication No. 2016-66182 discloses identity determination, that is, determining whether or not the radar object and the image target are the same object. For example, an object detection apparatus disclosed in Japanese Patent Application Laid-Open Publication No. 2016-66182 determines that the radar object and the image target are the same object if the radar object and the image target are close to each other and if a difference between a time to collision (TTC) for the radar object (hereinafter referred to as a radar TTC) and a TTC for the image target (hereinafter referred to as an image TTC) is within a predetermine range. Using the radar TTC and the image TTC in such a manner can improve the identity determination accuracy.

The image TTC is susceptible to a driving environment, a vehicle behavior or the like. For some scenes, calculation errors in the image TTC may be generated. Therefore, the object detection apparatus may mistakenly determine that the radar target and the image target correspond to the same object or that the radar target and the image target correspond to different objects due to calculation errors in the image TTC, which may make it difficult to generate a proper fusion target.

In addition, various methods, such as a method using a distance and relative speed to the image target and a method using a magnification ratio of the captured image, are used to calculate the image TTC. However, different methods for calculating the image TTC may lead to different scenes for which calculation errors in the image TTC can be generated. Therefore, it might be desirable to generate a fusion target taking into account which method to be used to calculate the image TTC.

In view of the above, it is desired to have a vehicle control apparatus capable of properly generating a fusion target even for scenes for which calculation errors in the image TTC can be generated.

SUMMARY

In accordance with an exemplary embodiment of the present disclosure, there is provided an apparatus for controlling an own vehicle that is a vehicle equipped with a radar device and an imaging device as object detection sensors configured to detect an object around the own vehicle. The apparatus includes:

a first acquirer configured to acquire a first predicted time to collision that is an estimated time until a collision of the own vehicle with a target detected by the radar device, the target detected by the radar device being referred to as a first target;

a second acquirer configured to acquire a second predicted time to collision that is an estimated time until a collision of the own vehicle with a target in a captured image detected by the imaging device, the target detected by the imaging device being referred to as a second target, the second predicted time being calculated using one of a plurality of calculation methods;

an identity determiner configured to, based on the first predicted time to collision and the second predicted time to collision, perform an identity determination as to whether or not the first target and the second target correspond to the same object;

a scene determiner configured to, upon acquiring the second predicted time to collision from the second acquirer, determine whether or not one of at least one specific scene is matched depending on the calculation method corresponding to the second predicted time to collision, the at least one specific scene being a scene where large calculation errors in the second predicted time to collision corresponding to the calculation method may be generated; and a determination aspect setter configured to, based on the calculation method and a result of determination by the scene determiner, set an aspect of the identity determination.

Identity determination as to whether or not the radar target and the image target correspond to the same object uses a predicted time to collision with the radar target that is a target detected by the radar device (the radar TTC) and a predicted time to collision with the image target that is a target detected by the imaging device (the image TTC). The image TTC is susceptible to a driving environment, a vehicle behavior or the like. Therefore, it is desired that the image TTC be calculated using a plurality of calculation methods. Scenes where image-TTC calculation errors may be generated are different for each calculation method.

In the above configuration, the second predicted time to collision (the image TTC) is calculated using one of a plurality of calculation methods. Specific scenes where large calculation errors may be generated are defined for the respective calculation method. When the second predicted time to collision is acquired, it is determined whether or not one of the specific scenes is matched depending on the calculation method corresponding to the acquired second predicted time to collision, and based on the calculation method and a determination result, an aspect of identity determination is set. Being focused on scenes where large calculation errors may be generated being different for each calculation method of the second predicted time to collision, specific scenes are defined depending on the respective calculation method. It is determined whether or not one of the specific scenes is matched depending on the calculation method corresponding to the acquired second predicted time to collision, based on the calculation method and a determination result, an aspect of identity determination is set, thereby enabling identity determination to be performed taking into account calculation errors depending on the calculation method of the second predicted time to collision.

This can properly generate a fusion target even in the scene where calculation errors in the second predicted time to collision may be generated.

DESCRIPTION OF SPECIFIC EMBODIMENTS

Hereinafter, exemplary embodiments of the present disclosure will be described in detail with reference to the accompanying drawings, in which like reference numerals refer to like or similar elements regardless of reference numerals and duplicated description thereof will be omitted.

Figure 1:
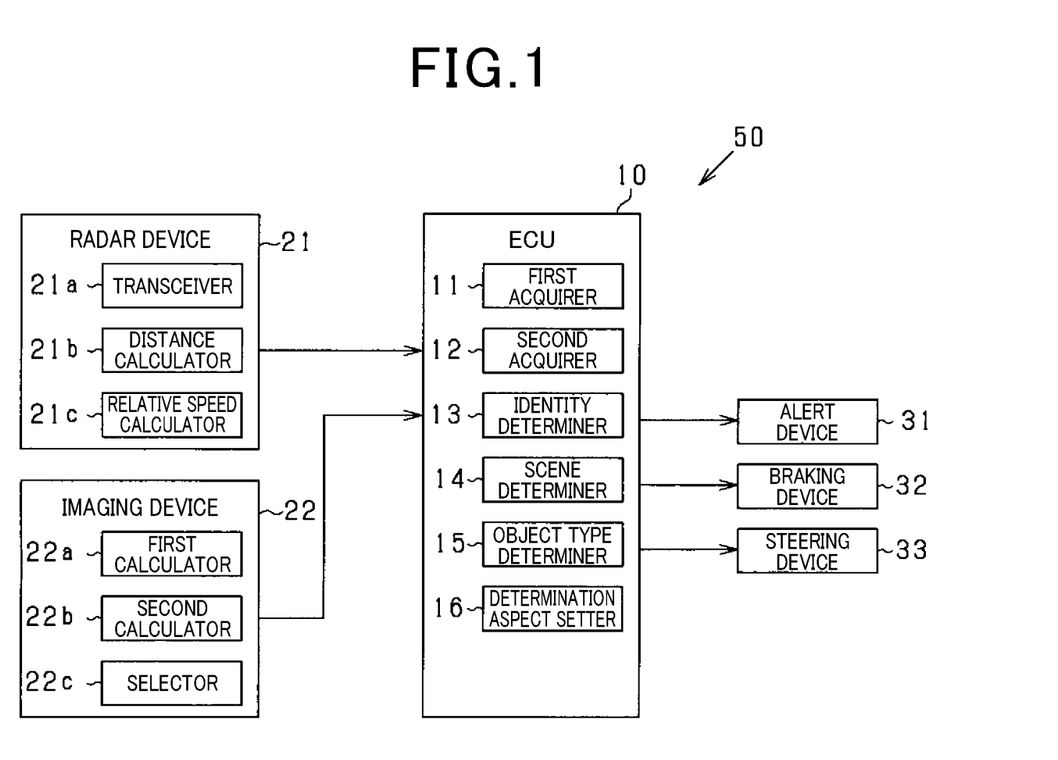
FIG. 1 schematically illustrates a block diagram of a vehicle control apparatus in accordance with one embodiment of the present disclosure.

FIG. 1 illustrates a pre-crash safety system (PCSS) that a vehicle control apparatus in accordance with one embodiment of the present disclosure is applied to. The PCSS is an example of a vehicle system mounted in a vehicle. The vehicle carrying the vehicle system is hereinafter referred to as an own vehicle. The vehicle system recognizes an object around the own vehicle, and if the recognized object is likely to collide with the own vehicle, execute a collision-avoidance action or collision-mitigation action of the own vehicle against the object.

The own vehicle 50, as shown in FIG. 1, includes a radar device 21 and an imaging device 22 as object detection sensors, an electric control unit (ECU) 10, an alert device 31, a braking device 32, a steering device 33. In the embodiment shown in FIG. 1, the ECU 10 serves as the vehicle control apparatus. The alert device 31, the braking device 32, and the steering device 33 serve as a safety apparatus.

The radar device 21 uses directional electromagnetic waves (referred to as probe waves), such as millimeter waves or laser beams, to detect an object ahead of the own vehicle as a radar target. The radar device 21 is provided in a front part of the own vehicle 50 such that an optical axis of the radar device 21 is directed ahead of the own vehicle 50.

The radar device 21 includes a transceiver 21a, a distance calculator 21b, and a relative speed calculator 21c. The transceiver 21a transmits a probe wave to a front area that horizontally spans a pre-defined range of angles from the light axis every predetermined time interval and receives a wave reflected from a surface of a forward object. The distance calculator 21b calculates a distance Dr to the radar target based on transmit and receive times. The relative speed calculator 21c calculates a relative speed Vr to the radar target based on a frequency shift caused by the Doppler effect of the reflected wave from the forward object.

The radar device 21 calculates a relative position of the own vehicle 50 to the radar target in a relative coordinate system where the origin is placed at the own vehicle 50, the X-axis is in a widthwise direction of the own vehicle 50, and the Y-axis is in a travel direction of the own vehicle 50. A component of the relative position in the widthwise direction (X-axis) is a lateral position of the radar target relative to the own vehicle 50. A component of the relative position in the travel direction (Y-axis) is a distance from the own vehicle 50 to the radar target. Object information (the distance, the relative speed, and the relative position) of the radar target detected by the radar device 21 is inputted to the ECU 10 every predetermined time interval.

The imaging device 22 is a vehicle-mounted camera configured using a charge-coupled device (CCD) camera, a complementary metal-oxide semiconductor (CMOS) image sensor, or a near-infrared camera. The imaging device 22 is provided in the widthwise center of the own vehicle 50 at a predetermined height (for example, near an upper edge of a windshield of the own vehicle) to capture, from an overhead perspective, images of a front area that horizontally spans a pre-defined range of angles from an imaging axis of the camera. The imaging device 22 may be a monocular camera or a stereoscopic camera.

The imaging device 22 detects an object included in a captured image as an image target. For example, an image target is detected by applying pattern matching using various recognition dictionaries to the captured image. The various recognition dictionaries may include a vehicle dictionary for identifying a vehicle, a pedestrian dictionary for identifying a pedestrian, a bicycle dictionary for identifying a bicycle, and an on-road stationary object dictionary for identifying an on-road stationary object, such as a guardrail or the like. Like a position of the radar target, a position of the image target is acquired in a relative coordinate system where the origin is placed at the own vehicle 50, the X-axis is in the widthwise direction of the own vehicle 50, and the Y-axis is in the travel direction of the own vehicle 50.

The imaging device 22 calculates a predicted time to collision (referred to as an image TTC) that is an estimated time until a collision of the own vehicle 50 with the detected image target. Various methods for calculating the image TTC are known. In the present embodiment, the imaging device 22 uses a plurality of calculation methods to calculate the image TTC in parallel. As shown in FIG. 1, the imaging device 22 includes a first calculator 22a and a second calculator 22b. The first calculator 22a and the second calculator 22b use different calculation methods to calculate an image TTC in parallel.

More specifically, in the present embodiment, two calculation methods are used, where one of the two calculation methods is a calculation method of calculating an image TTC based on a distance Di and a relative speed Vi to the image target (hereinafter referred to as a first calculation method) and the other is a calculation method of calculating an image TTC based on a rate of change in size (i.e., a magnification ratio) of the image target (hereinafter referred to as a second calculation method). The first calculator 22a calculates the image TTC using the first calculation method. The second calculator 22b calculates the image TTC using the second calculation method.

The first calculation method will now be described. In this method, the first calculator 22a calculates a distance Di to the image target based on the captured image, where a well-known technique may be used to calculate the distance Di to the image target. For example, in the case where the imaging device 22 is a stereoscopic camera, the first calculator 22a acquires, from images simultaneously captured by a plurality of cameras, disparity information for each pixel, and using the disparity information, calculates the distance Di to the image target. In the case where the imaging device 22 is a monocular camera, the principle of a motion stereo method is used. More specifically, the first calculator 22a acquires, from a plurality of frames taken at different times and a movement distance between frames, disparity information for each pixel, and using the disparity information, calculates the distance Di to the image target. The relative speed Vi is calculated based on an amount of change in the distance Di per unit time.

In the first calculation method, the image TTC is given by the distance Di from the own vehicle 50 to the image target divided by an absolute value of the relative speed Vi of the own vehicle 50 to the image target. For example, as shown in the following equation (1), the image TTC is calculated using an equation of linear uniform motion.

$$\text{image TTC}=Di/Vi \quad (1)$$

The second calculation method will now be described. In this method, the second calculator 22b calculates a magnification ratio k, where the magnification ratio k is a ratio of the size of the image target in the current image to the size of the same image target in the previous image. A well-known technique may be used to calculate the magnification ratio k. For example, the Lucas-Kanade (LK) method that is a combination of the method of least squares and the hill climbing method, or the good feature to track (GFTT) method may be used.

Figure 2:
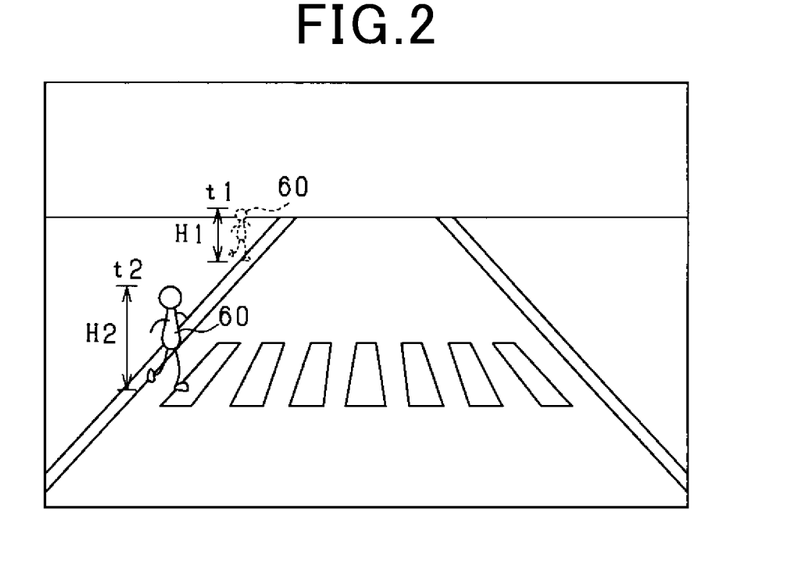
FIG. 2 illustrates an example magnification ratio of a captured image.

For example, as shown in FIG. 2, in the case where the image target is a pedestrian 60, the second calculator 22b calculates a magnification ratio k based on a change in length (height in FIG. 2) of the pedestrian 60 over time. The magnification ratio k may be calculated according the following equation (2), where H1 is a height of the pedestrian 60 acquired at time t1 and H2 is a height of the pedestrian 60 acquired at time t2 later than the time t1.

$$k=(H2-H1)/(t2-t1) \quad (2)$$

As an alternative, a magnification ratio k may be calculated based on a change in width (lateral length) of the pedestrian 60 over time. As another alternative, a magnification ratio k may be calculated based on a change in feature point (vanishing point) or predefined area over time. The second calculator 22b calculates an image TTC based on the magnification ratio k.

After calculation of the image TTC by each of the first calculator 22a and the second calculator 22b, the selector 22c selects one of the image TTC calculated by the first calculator 22a and the image TTC calculated by the second calculator 22b. More specifically, the selector 22c selects a more suitable one of the image TTC calculated by the first calculator 22a and the image TTC calculated by the second calculator 22b taking into account a driving environment, a vehicle behavior and other conditions. The selected image TTC is inputted to the ECU 10.

The alert device 31 alerts a driver of the own vehicle that an object is present ahead of the own vehicle, in response to a control command from the ECU 10. The alert device 31 may include a speaker for outputting an audio message or a display for displaying an image provided in a passenger compartment.

The braking device 32 is configured to brake the own vehicle 50. The braking device 32 is activated when the probability of colliding with a forward object has increased. More specifically, the braking device 32 assists the driver in increasing a braking force (braking assistance), or if no braking action has been taken by the driver, effects automatic braking (automatic braking).

The steering device 33 is configured to control a travel path of the own vehicle 50. The steering device 33 is activated when the probability of colliding with a forward object has increased. More specifically, the steering device 33 assists the driver in steering (steering assistance), or if no steering action has been taken by the driver, effects automatic steering (automatic steering).

The ECU 10 is configured as a microcomputer including a central processing unit (CPU) and a memory that is a non-transitory computer readable storage medium (e.g., random access memory (RAM), read only memory (ROM), and flash, etc.). The ECU 10 performs controlling the own vehicle 50 with reference to programs and control data stores in the memory. The ECU 10 recognizes an object based on detection results from the radar device 21 and the imaging device 22, and performs PCS to control the alert device 31, the braking device 32, and the steering device 33.

The ECU 10 determines that a radar target detected by the radar device 21 and an image target detected by the imaging device 22 correspond to the same object if the radar target and the image target are in proximity to each other, thereby generating a fusion target by fusion of the radar target and the image target.

In the present embodiment, a predicted time to collision for the radar target (a radar TTC) and a predicted time to collision for the image target (an image TTC) are used to generate a fusion target. The ECU 10 includes a first acquirer 11 configured to acquire the radar TTC, a second acquirer 12 configured to acquire the image TTC, and an identity determiner 13 configured to, based on the radar TTC and the image TTC, determine whether or not the radar target and the image target correspond to the same object.

The first acquirer 11 acquires the radar TTC based on object information about a radar target received from the radar device 21. The radar TTC takes a value of a distance Dr to the radar target divided by a relative speed Vr of the own vehicle 50 and the radar target. For example, as shown in the following equation (3), the radar TTC is calculated using the equation of linear uniform motion.

$$\text{radar TTC}=Dr/Vr \quad (3)$$

The second acquirer 12 acquires the image TTC selected by the selector 22c.

The identity determiner 13 determines that the radar target and the image target correspond to the same object if a criterion using the radar TTC and the image TTC is met. More specifically, if a difference between the radar TTC and the image TTC is within a predetermined range, that is, if an absolute value of a difference between the radar TTC and the image TTC is less than a predetermined threshold Th, it is determined that the radar target and the image target correspond to the same object. This is because a small difference between the radar TTC and the image TTC ensures that the radar target and the image target are likely to correspond to the same object.

Figure 3:
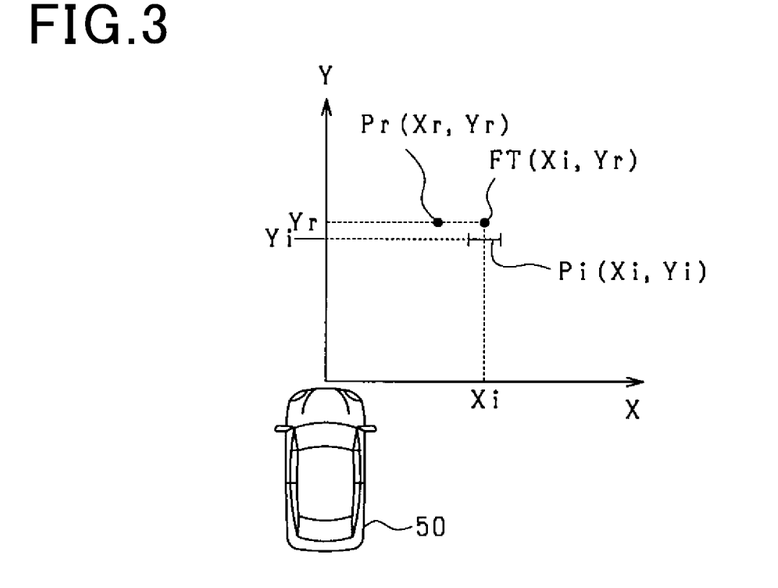
FIG. 3 illustrates an example of generating a fusion target.

If it is determined that the radar target and the image target correspond to the same object, a fusion target is generated. As shown in FIG. 3, an X-coordinate of the fusion target FT is an X-coordinate Xi of the image target Pi, and a Y-coordinate of the fusion target FT is a Y-coordinate Yr of the radar target Pr. In the relative coordinate system of FIG. 3, the Y-coordinate Yr corresponds to a distance Dr to the radar target, and the Y-coordinate Yi corresponds to a distance Di to the image target.

If it is determined that the radar target and the image target correspond to different objects, that is, if an absolute value of a difference between the radar TTC and the image TTC is equal to or greater than the predetermined threshold Th, then no fusion target is generated. In such a case, there is a large deviation between the radar TTC and the mage TTC, so that the radar target and the image target are individually acquired.

The ECU 10 determines, for each target, whether or not the own vehicle 50 is likely to collide with the target. More specifically, the ECU 10 determines, for each target, whether or not a lateral position of the target is within a predicted region of collision for collision avoidance control. In such a configuration, if the lateral position of the target is within the predicted region of collision, it is determined that the own vehicle 50 is likely to collide with the target.

If the ECU 10 determines that the own vehicle 50 is likely to collide with a target, the ECU 10 activates at least one of the safety devices 31,32,33 based on the TTC for the target and activation timings of the respective safety devices 31, 32, 33. More specifically, if the TTC decreases to or below the activation timing for the alert device 31, the ECU 10 activates the speaker or the like to provide an alert to the driver of the own vehicle. If the TTC decreases to or below the activation timing for the braking device 32, the ECU 10 activates automated braking to perform collision speed reduction control. The TTC used to determine whether or not the timing for each safety device is reached may be either the radar TTC or the image TTC. Such PCS control is intended to avoid or mitigate against collision between the target and the own vehicle 50.

However, the image TTC is susceptible to a driving environment, a vehicle behavior or the like. For some scenes that are different in the driving environment or the vehicle behavior, calculation errors in the image TTC may be generated. In such a case, a result of identity determination may become unstable due to the calculation errors. That is, the object detection apparatus may mistakenly determine that the radar target and the image target correspond to the same object or that the radar target and the image target correspond to different objects due to calculation errors in the image TTC. For example, an image target may become more difficult to detect in a nighttime driving scene than in a daytime driving scene. Thus, calculation errors in the image TTC are more liable to be generated in a nighttime driving scene than in a daytime driving scene. That is, larger calculation errors may be generated in a nighttime driving scene than in a daytime driving scene.

As described above, a plurality of image TTC calculation methods are known. Driving scenes for which large calculation errors in the image TTC may be generated are different depending on which method is used to calculate the image TTC. For example, the accuracy of the distance Di and the relative speed Vi used in the first calculation method increases with increasing number of times the same image target is successively detected. Therefore, in a scene such that the same image is successively detected only a small number N of times, calculation errors in the distance Di and the relative speed Vi are liable to be generated. Thus, in the first calculation method, large calculation errors in the image TTC are liable to be generated. In contrast, in the second calculation method, the magnification ratio k used in this method is calculated based on a past (for example, previous) captured image and the current captured image. A calculation result of the image TTC may therefore be less susceptible to the number of times N the same image is successively detected. Therefore, in the second calculation method, even for a scene such that the same image is successively detected only a small number of times N, calculation errors in the image TTC are less liable to be generated. Thus, different parameters are used in different methods for calculating the image TTC. Differences in accuracy between such parameters may lead to different scenes for which large calculation errors in the image TTC are generated.

In conventional vehicle control apparatuses, the ECU 10 is configured to acquire the image TTC selected by the imaging device 22. Regardless of which calculation method is used to calculate the image TTC, the ECU 10 determines whether or not the radar target and the image target correspond to the same object based on a predefined criterion. Thus, the ECU 10 is not configured to take into account calculation errors in each method used to calculate the image TTC in a scene that the own vehicle is encountering. Such a scene is hereinafter referred to as an encountered scene.

In the present embodiment, the ECU 10 acquires an image TTC calculated using one of a plurality of calculation methods. When acquiring the image TTC, the ECU 10 determines whether or not an encountered scene is a specific scene for which large calculation errors may be generated in the calculation method corresponding to the acquired image TTC, and based on the corresponding calculation method and the determination result, sets an identity determination aspect. More specifically, in the case where it is determined that the encountered scene is a specific scene for the calculation method corresponding to the image TTC, the ECU 10 loosens a criterion for the identity determination as compared to the case where it is not determined that the encountered scene is a specific scene for the calculation method corresponding to the image TTC. That is, depending on which method is used to calculate the image TTC, calculation errors in the encountered scene are taken into account to perform the identity determination.

In the present embodiment, the ECU 10 includes a scene determiner 14, an object type determiner 15, and a determination aspect setter 16. The second acquirer 12 acquires the image TTC and the method used to calculate the image TTC. The second acquirer 12 can acquire the image TTC calculated using any one of the plurality of calculation methods.

The scene determiner 14 determines whether or not an encountered scene is a specific scene based on the calculation method acquired by the second acquirer 12. The specific scene is a driving environment or a driving scene for which large calculation errors in the image TTC may be generated. That is, the specific scene corresponds to a scene weak in calculation of the image TTC. Specific scenes for each calculation method are pre-stored in the scene determiner 14. More specifically, for each calculation method, a plurality of specific scenes are stored in the scene determiner 14. For example, in the case of the first calculation method, the specific scenes may include (1) a nighttime driving scene, (2) an acceleration or deceleration scene, (3) a cutoff scene, and (4) a scene where the number of detections N is less than a predetermined value. In the case of the second calculation method, the specific scenes may include (1) a nighttime driving scene and (2) an acceleration or deceleration scene.

The scene determiner 14 is configured to, if the calculation method of the image TTC acquired by the second acquirer 12 is the first calculation method, determine which one of the scenes (1) to (4) an encountered scene is. The scene determiner 14 is configured to, if the calculation method of the image TTC acquired by the second acquirer 12 is the second calculation method, determines which one of the scenes (1) to (2) an encountered scene is. Calculation errors that may be generated in each calculation method will now be described for each of the scenes (1) to (4).

The nighttime driving scene will now be described. A captured image in the nighttime driving scene has a smaller difference in brightness (contrast) between adjacent pixels than a captured image in a daytime driving scene. This makes it difficult to extract edge points based on brightness information, which thus makes it difficult to detect an image target. Thus, in the nighttime driving scene, large calculation errors in the image TTC may be generated in both the first and second calculation methods. It should be noted that the nighttime driving scene is not only one scene having a small difference in brightness (contrast) between adjacent pixels. Any scene having a small difference in brightness (contrast) between adjacent pixels may cause large calculation errors in the image TTC in both the first and second calculation methods. For example, an in-tunnel driving scene corresponds to such a specific scene.

The acceleration or deceleration scene will now be described. When the own vehicle 50 is in the acceleration or deceleration scene, pitching caused by acceleration or deceleration may affect an angular field of view in an up-down direction of the captured image. That is, there may be relatively large changes in a vertical position of the vanishing point or a vertical position of the image target between the previous and current images. Thus, when the own vehicle 50 is in the acceleration or deceleration scene, large calculation errors in the image TTC may be generated in both the first and second calculation methods.

The cutoff scene will now be described. For example, when the own vehicle 50 approaches less than a predetermined distance to an image target, at least a portion of the image target, e.g., a lower end of the mage target, may be cut off in the angular field of view of the imaging device 22. In the present embodiment, such a scene is referred to as a cutoff scene. The distance Di used by the first calculation method is calculated based on the lower end of the image target. Therefore, in such a cutoff scene, the accuracy of the distance di in the cutoff scene may be degraded. Thus, in the cutoff scene, calculation errors in the image TTC in the first calculation method may be generated. In the second calculation method using the magnification ratio k, for example, calculating the magnification ratio k based on a limited range of the image allows the magnification ratio k to be accurately calculated.

A scene where the number of detections N is less than a predetermined value will now be described. For example, the accuracy of the distance Di and the relative speed Vi used in the first calculation method increases with increasing number of times the same image target is successively detected. Therefore, in a scene where the number of detections N is less than a predetermined number, the accuracy of the distance Di and the relative speed Vi may be degraded, which may cause calculation errors in the image TTC in the first calculation method.

As above, a plurality of scenes are set for each calculation method, where a different set of scenes are set for a different method. A result of determination made by the scene determiner 14 is inputted to the determination aspect setter 16.

The determination aspect setter 16 sets an identity determination aspect based on the image TTC calculation method acquired from the second acquirer 12 and a determination result from the scene determiner 14. More specifically, a criterion for the identity determination is set as an identity determination aspect. If it is determined by the scene determiner 14 that a specific scene for a respective calculation method is matched, the determination aspect setter 16 increases the threshold Th, thereby loosening the criterion. Increasing the threshold Th can make it easier to determine that the image target and the radar target correspond to the same object, which can make it less easy to be mistakenly determined that the image target and the radar target correspond to different objects.

Figure 4:
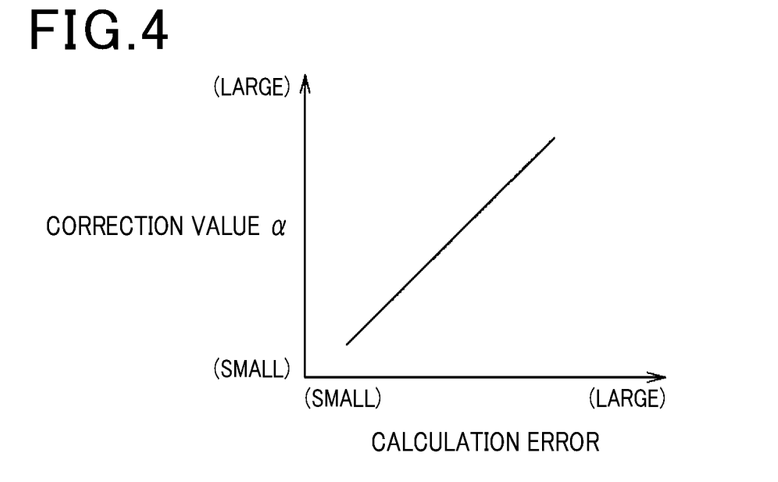
FIG. 4 illustrates an example relationship between threshold correction value and calculation error.

The determination aspect setter 16 sets the threshold Th depending on a calculation error level for each scene in each calculation method. The threshold Th is set by adding a predestined correction value a to a reference value. The correction value a is correlated with the calculation error level as shown in FIG. 4. That is, in a scene having a relatively high calculation error level of the image TTC, a relatively large discrepancy between the radar TTC and the image TTC may be exhibited. Therefore, the threshold Th is increased with increasing calculation error. That is, the correction value a added to the reference value is increased. Meanwhile, in a scene having a relatively low calculation error level of the image TTC, a relatively small discrepancy between the radar TTC and the image TTC may be exhibited. Therefore, the threshold Th is decreased with decreasing calculation error. That is, the correction value a added to the reference value is decreased.

The calculation error level is different for each of the scenes (1) to (4). Therefore, preferably, the threshold Th may be set taking into account the calculation error level for each scene. For example, assuming that, for the scenes (1) to (4) of the first calculation method, the calculation error is increased in the order of (1), (2), (3), and (4), the threshold Th in the scene (2) (i.e, the acceleration or deceleration scene) is greater than the threshold Th in the scene (1) (i.e., the nighttime driving scene). Also, the threshold Th in scene (3) (i.e., the cutoff scene) is greater than the threshold Th in scene (1) (i.e., the nighttime driving scene).

In such a configuration, two or more of the scenes (1) to (4) may overlap. In such a case, one of the overlapping scenes, in which larger calculation errors may be generated, may be preferentially selected, where the threshold Th may be set based on the selected scene.

In the scenes where image-TTC calculation errors may be generated, the calculation error level may be different for each type of object corresponding to the image target. For example, in the nighttime driving scene, the calculation error level may be different depending on whether the object corresponding to the image target for which the image TTC is calculated is a pedestrian or a vehicle. In the present embodiment, if a specific scene for the respective calculation method is matched, a criterion is set depending on a type of object corresponding to the image target. That is, a criterion for the identity determination is set taking into account calculation errors for each type of object corresponding to the image target in each scene for the respective calculation method, as well as calculation errors in the scene.

The object type determiner 15 determines a type of object corresponding to the image target in the captured image via well-known pattern matching or the like. More specifically, the object type determiner 15 determines whether the object corresponding to the image target is a pedestrian, a vehicle, or a bicycle, based on dictionary information about a pedestrian, a vehicle, and a bicycle. A determination result is inputted to the determination aspect setter 16.

The determination aspect setter 16 sets the threshold Th depending on a type of object in each scene for the respective calculation method. The threshold Th is set based in the calculation error level for each type of object. The determination aspect setter 16 has a conversion map stored therein indicating a threshold Th for each type of object in each specific scene for the respective calculation method.

Figure 5:
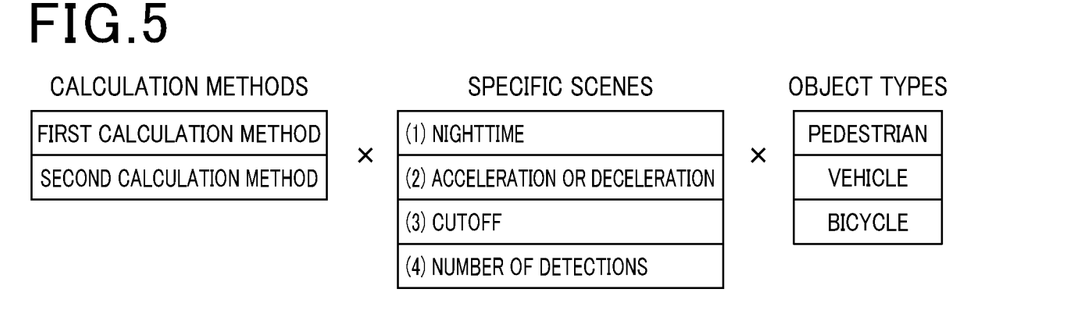
FIG. 5 illustrates an example map between calculation methods, specific scenes and object types.

FIG. 5 illustrates conversion maps for respective combinations used to set the threshold Th. For example, the first calculation method and the second calculation method are used as calculation methods of the image TTC. The scenes (1) to (4) are set as specific scenes for the first calculation method, and the scenes (1) and (2) are set as specific scenes for the second calculation method. For example, in a configuration where a pedestrian, a vehicle, and a bicycle are rendered as object types, a total of eighteen conversion maps are prepared.

The identity determination processing is performed by the identity determiner 13 based on a criterion using the threshold Th set by the determination aspect setter 16.

Figure 6:
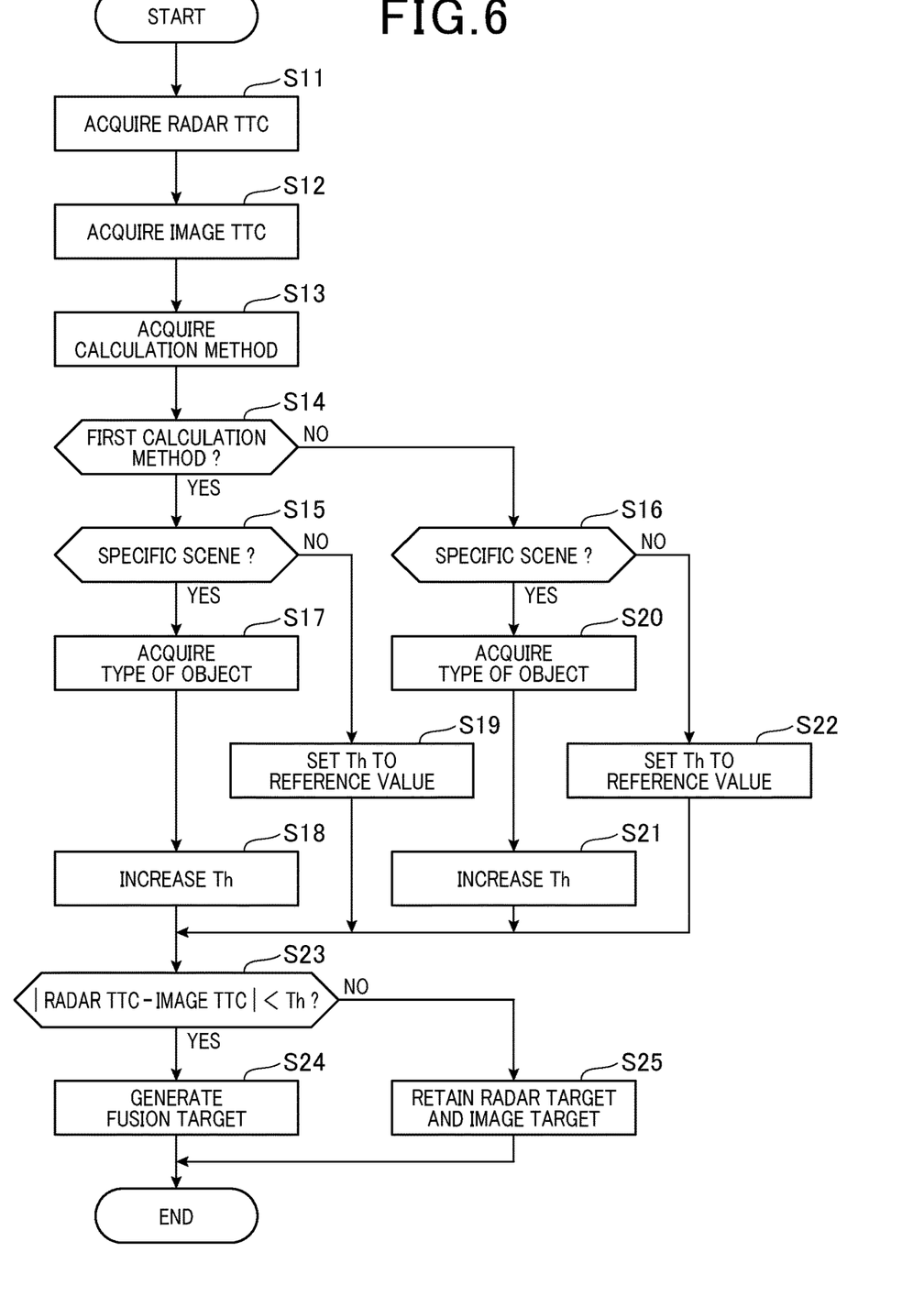
FIG. 6 illustrates a flowchart of identity determination processing.

The identity determination processing performed by the ECU 10 will now be described with reference to a flowchart of FIG. 6. This processing is performed iteratively every predetermined time interval.

At step S11, the first acquirer 11 acquires a radar TTC based on object information about a radar target detected by the radar device 21. At step S12, the second acquirer 12 acquires an image TTC calculated by the imaging device 22. More specifically, the second acquirer 12 acquires the image TTC selected by the selector 22c. At step S13, the second acquirer 12 acquires a calculation method of calculating the image TTC acquired at step S12. In the present embodiment, the calculation method acquired at step S13 is the first calculation method or the second calculation method.

At step S14, the scene determiner 14 determines whether or not the calculation method of calculating the image TTC acquired at step S12 is the first calculation method. If the answer is "YES" at step S14, then the process flow proceeds to step S15. If the answer is "NO" at step S14, then the process flow proceeds to step S16. At each of steps S15 and S16, the scene determiner 14 determines whether or not one of the specific scenes for the respective calculation method where large calculation errors may be generated is matched. More specifically, at step S15, one of the scenes (1) to (4) is matched. At step S16, one of the scenes (1) and (2) is matched. The scene (1) is the nighttime driving scene; the scene (2) is the acceleration or deceleration scene. The scene (3) is the cutoff scene, and the scene (4) is a scene where the number of detections N is less than predetermined number.

At each of steps S15 and S16, a well-known method may be used to determine whether or not one of the specific scenes for the respective calculation method is matched. For example, the nighttime driving scene is detected by determining whether or not the headlights are lighting. The acceleration or deceleration scene is detected based on an acceleration A calculated from the vehicle speed of the own vehicle 50. Whether or not cutoff scene is matched is determined by detecting transition from a scene where the image target can be detected to a scene where the image target cannot be detected. Whether or not the number of detections N is less than a predetermined number is determined by comparing the number of detections N with a predetermined number Nth.

If the answer is "YES" at step S15, then the process flow proceeds to step S17, where the object type determiner 15 determines a type of object. At step S18, the determination aspect setter 16 sets the threshold Th depending on the calculation method of calculating the image TTC and the determination result at step S15 and the type of object. More specifically, the determination aspect setter 16 sets the threshold Th with reference to the conversion maps of the threshold Th taking into account calculation errors for each specific scene in the respective method and calculation errors for each type of object for each specific scene in the respective method. In the present embodiment, if one of the specific scenes for the respective calculation method is matched, the determination aspect setter 16 increases the threshold Th to a value greater than the reference value, thereby making it easy for a criterion for the identity determination to be met. If the answer is "NO" at step S15, that is, if no specific scene is matched, then the process flow proceeds to step S19, where the determination aspect setter 16 sets the threshold Th to a normal value. Operations at steps S16, S20 to S22 are similar to the operations at steps S15, S17 to S19.

Upon setting the threshold Th, the process flow proceeds to step S23, where the identity determiner 13 performs an identity determination. More specifically, the identity determiner 13 determines whether or not an absolute value of a difference between the radar TTC and the image TTC is less than the threshold Th. If the answer is "YES" at step S23, the process flow proceeds to step S24, where it is determined that the radar target and the image target correspond to the same object and a fusion target is thus generated. If the answer is "NO" at step S23, the process flow proceeds to step S25, where it is determined that the radar target and the image target correspond to different objects and the radar target and the image target are individually retained. For each target, the ECU 10 determines whether or not the own vehicle 50 is likely to collide with the target.

The embodiment set forth above can provide the following advantages.

The identity determination as to whether or not the radar target and the image target correspond to the same object uses the radar TTC and the image TTC. The image TTC is susceptible to a driving environment, a vehicle behavior or the like. Therefore, it is desired that the image TTC be calculated using a plurality of calculation methods, where scenes where image-TTC calculation errors may be generated are different for each calculation method. In such a configuration, being focused on this fact that scenes where image-TTC calculation errors may be generated are different for each calculation method, specific scenes where large calculation errors may be generated are defined for each calculation method. It is determined whether or not a specific scene is matched depending on the respective calculation method, and based on the calculation method and a determination result, an aspect of identity determination is set, thereby enabling identity determination to be performed taking into account calculation errors depending on the calculation method of the image TTC. This can properly generate a fusion target even in the scene where calculation errors of the image TTC may be generated.

In the scenes where large calculation errors of the image TTC may be generated, it may mistakenly be determined that the radar target and the image target correspond to the same object or that the radar target and the image target correspond to different objects due to calculation errors in the image TTC. In the above configuration, in the case where it is determined that a specific scene for the respective calculation method of calculating the image TTC is matched, a criterion for the identity determination is loosened as compared to the case where it is not determined that a specific scene for the calculation method of the image TTC is not matched. In the scenes where large calculation errors in the image TTC may be generated, loosening the criterion can prevent the radar target and the image target from being determined to correspond to different objects.

The criterion includes that an absolute value of a difference between the radar TTC and the image TTC is less than the threshold Th, which can improve the identity determination accuracy.

To loosen the criterion, the threshold Th is set to a value greater than the reference value. Therefore, even if a difference between the radar TTC and the image TTC increases, the criterion thus becomes easier to be met and it becomes easier to be determined that the radar target and the image target correspond to the same object. This can prevent the radar target and the image target from being mistakenly determined to correspond to different objects.

In scenes where large image-TTC calculation errors may be generated, the calculation error level may be different for each type of object corresponding to the image target. With this in mind, if a specific scene for the respective calculation method is matched, a specific criterion is set depending on a type of object corresponding to the image target. A criterion for identity determination may be set taking into account calculation errors in each scene for the respective calculation method, as well as calculation errors for each object type.

There are a plurality of methods of calculating the image TTC, including a first method using a distance Di and a relative speed Vi to the image target and a second method using a rate of change in size (i.e., a magnification ratio) of the image target in a captured image. These methods use different parameters to calculate the image TTC. Scenes where large image-TTC calculation errors may be generated could be different for each of these methods. In the present embodiment, different specific scenes are defined for each of the first and second calculation methods. Therefore, different scenes where large calculation error may be generated can be determined depending on whether the first or second calculation method is used, thereby enabling properly performing identity determination.

In each image-TTC calculation method, the calculation error level (i.e., the magnitude of the calculation error) may be different for each scene. For example, in the same calculation method, the calculation error level may be different for the nighttime driving scene or the acceleration scene. With this in mind, a plurality of scenes different in the calculation error level are defined for each image-TTC calculation method. In such a configuration, which one of the scenes is matched is determined depending on which one of the calculation methods is used. This allows a difference in the calculation error level between the scenes for each calculation method to be taken into account, thereby enabling properly performing identity determination.

Modifications (M1) In the above embodiment, the first and second calculation methods are used. As an alternative, three or more calculation methods may be used. In such an embodiment, a plurality of specific scenes may be defined for each calculation method, and which one of the specific scenes is matched may be determined for each calculation method.

(M2) In the above embodiment, four specific scenes (1) to (4) are set for the first calculation method and two specific scenes (1) and (2) are set for the second calculation method. As an alternative, another specific scene may be added to the specific scenes for at least one of the calculation methods. As another alternative, one of the specific scenes for at least one of the calculation methods may be replaced with another specific scene.

(M3) In the above embodiment, the determination aspect setter 16 sets the threshold Th taking into account an object type. As an alternative, the determination aspect setter 16 may set the threshold Th based on a result of determination by the scene determiner 14 and the calculation method.

In the above embodiment, the determination aspect setter 16 may set the threshold Th taking into account a distance Dr to a radar target and a distance Di to an image target and an azimuth of each target.

(M4) In the above embodiment, if a specific scene (i.e., a scene weak in calculation) is matched, the threshold Th is increased, thereby loosening the criterion. As an alternative, if it is determined that a specific scene is matched, the threshold Th may be decreased, thereby tightening the criterion. For example, at steps S18 and S21 of FIG. 6, the threshold Th may be set to a value less than the reference value. In such a case, the threshold Th may be set by subtracting a specific correction value a from the reference value. The correction value a may be correlated with the calculation error level as shown in FIG. 4. In such an alternative embodiment, the threshold Th may be decreased, which can make the criterion difficult to be met. This can make it less easy to be mistakenly determined that the radar target and the image target correspond to the same object.

As another alternative, the threshold Th may be increased for each of some of the plurality of specific scenes while the threshold Th may be decreased for each of the others.

(M5) In the above embodiment, a type of object corresponding to the image target is a pedestrian, a vehicle, or a bicycle. As an alternative, a type of object corresponding to the image target may be divided into a plurality of subtypes. For example, a type of vehicle may be divided into two subtypes, such as a stationary vehicle and a leading vehicle. A type of bicycle may be divided into two subtypes, such as a crossing bicycle and a non-crossing bicycle. In such an alternative embodiment, conversion maps of the threshold Th may be prepared for each subtype. As another alternative, a type other than the pedestrian, the vehicle, and the bicycle may be added (an on-road stationary object etc.).

(M6) In the above embodiment, the criterion for identity determination is that an absolute value of a difference between the radar TTC and the image TTC is less than a threshold Th. As an alternative, a criterion for identity determination that the radar target and the image target are in proximity to each other may be added. For example, if a radar search area set based on the radar target and an image search area set based on the image target overlap, then it is determined that the radar target and the image target are in proximity to each other. As an alternative, if a distance between a relative position of the radar target and a relative position of the image target is less than a predetermined distance, then it may be determined that the radar target and the image target are in proximity to each other.

What is claimed is:

1. An apparatus for controlling an own vehicle that is a vehicle equipped with a radar device and an imaging device as object detection sensors configured to detect an object around the own vehicle, the apparatus comprising:
   a first acquirer, performed by an electric control unit, configured to acquire a first predicted time to collision that is an estimated time until a collision of the own vehicle with a target detected by the radar device, the target detected by the radar device being referred to as a first target;
   a second acquirer, performed by an electric control unit, configured to acquire a second predicted time to collision that is an estimated time until a collision of the own vehicle with a target in a captured image detected by the imaging device, the target detected by the imaging device being referred to as a second target, the second predicted time being calculated using one of a plurality of calculation methods;

an identity determiner, performed by an electric control unit, configured to, based on the first predicted time to collision and the second predicted time to collision, perform an identity determination as to whether or not the first target and the second target correspond to a same object;

a scene determiner, performed by an electric control unit, configured to, upon acquiring the second predicted time to collision from the second acquirer, determine whether or not one of at least one specific scene is matched depending on the one of the plurality of calculation methods corresponding to the second predicted time to collision, the at least one specific scene being a scene where large calculation errors in the second predicted time to collision corresponding to the one of the plurality of calculation methods may be generated; and a determination aspect setter, performed by an electric control unit, configured to, based on the one of the plurality of calculation methods and a result of determination by the scene determiner, set an aspect of the identity determination.

2. The apparatus according to claim 1, wherein:

the identity determiner is configured to, if a predetermined criterion using the first predicted time to collision and the second predicted time to collision is met, determine that the first target and the second target correspond to the same object; and the determination aspect setter is configured to, if it is determined by the scene determiner that the at least one specific scene for the one of the plurality of calculation methods corresponding to the second predicted time to collision is matched, loosen the predetermined criterion as compared to a case where it is determined by the scene determiner that none of the at least one specific scene for the one of the plurality of calculation methods corresponding to the second predicted time to collision is matched.

3. The apparatus according to claim 1, wherein:

the identity determiner is configured to, if a predetermined criterion using the first predicted time to collision and the second predicted time to collision is met, determine that the first target and the second target correspond to the same object; and the determination aspect setter is configured to, if it is determined by the scene determiner that the at least one specific scene for the one of the plurality of calculation methods corresponding to the second predicted time to collision is matched, tighten the predetermined criterion as compared to a case where it is determined by the scene determiner that none of the at least one specific scene for the one of the plurality of calculation methods corresponding to the second predicted time to collision is matched.

4. The apparatus according to claim 2, wherein:

the predetermined criterion includes that a difference between the first predicted time to collision and the second predicted time to collision is within a predetermined range; and the determination aspect setter is configured to widen the predetermined range to thereby loosen the predetermined criterion.

5. The apparatus according to claim 3, wherein:

the predetermined criterion includes that a difference between the first predicted time to collision and the second predicted time to collision is within a predetermined range; and the determination aspect setter is configured to narrow the predetermined range to thereby tighten the predetermined criterion.

6. The apparatus according to claim 2, further comprising an object type determiner, performed by an electric control unit, configured to, based on the captured image, determine a type of object corresponding to the second target, wherein the determination aspect setter is configured to, if it is determined by the scene determiner that one of the at least one specific scene for the one of the plurality of calculation methods corresponding to the second predicted time to collision is matched, set the predetermined criterion depending on the type of object determined by the object type determiner.

7. The apparatus according to claim 3, further comprising an object type determiner, performed by an electric control unit, configured to, based on the captured image, determine a type of object corresponding to the second target, wherein the determination aspect setter is configured to, if it is determined by the scene determiner that one of the at least one specific scene for the one of the plurality of calculation methods corresponding to the second predicted time to collision is matched, set the predetermined criterion depending on the type of object determined by the object type determiner.

8. The apparatus according to claim 1, wherein:

the plurality of calculation methods comprise a first calculation method and a second calculation method, the first calculation method calculating the second predicted time to collision based on a distance and relative speed between the own vehicle and the second target, the second calculation method calculating the second predicted time to collision based on ratio of change in size of the second target in the captured image; and the at least one specific scene is defined separately for each of the first calculation method and the second calculation method.

9. The apparatus according to claim 1, wherein:

the at least one specific scenes comprises a plurality of scenes different in calculation error level for a respective calculation method of calculating the second predicted time to collision; and the scene determiner is configured to, upon acquiring the second predicted time to collision from the second acquirer, determine whether or not one of the plurality of scenes is matched depending on the respective calculation method corresponding to the second predicted time to collision acquired from the second acquirer.

10. A method for controlling an own vehicle that is a vehicle equipped with a radar device and an imaging device as object detection sensors configured to detect an object around the own vehicle, the method comprising:

acquiring a first predicted time to collision that is an estimated time until a collision of the own vehicle with a target detected by the radar device, the target detected by the radar device being referred to as a first target;

acquiring a second predicted time to collision that is an estimated time until a collision of the own vehicle with a target in a captured image detected by the imaging device, the target detected by the imaging device being referred to as a second target, the second predicted time being calculated using one of a plurality of calculation methods;

performing an identity determination as to whether or not the first target and the second target correspond to a same object based on the first predicted time to collision and the second predicted time to collision;

upon acquiring the second predicted time to collision from the second acquirer, determining whether or not one of at least one specific scene is matched depending on the one of the plurality of calculation methods corresponding to the second predicted time to collision, the at least one specific scene being a scene where large calculation errors in the second predicted time to collision corresponding to the one of the plurality of calculation methods may be generated; and setting an aspect of the identity determination based on the one of the plurality of calculation methods and a result of determination by the scene determiner.

11. The apparatus according to claim 1, wherein the at least one specific scene is one of a plurality of predetermined specific scenes.

* * * * *

(12) SUPPLEMENTAL EXAMINATION CERTIFICATE

United States Patent  
Takaki

(10) Number: US 10,592,755 F1  
(45) Certificate Issued: Aug. 17, 2020

Control No.: 96/000,333  
Primary Examiner: Stephen J. Ralis

Filing Date: Jul. 20, 2020

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2012048643 A | 3/2012 |